(No Model.) 3 Sheets—Sheet 3.
F. S. COOK, Dec'd.
J. W. Cook, Administrator.
MACHINE FOR TAPPING SCREW NUTS.
No. 507,972. Patented Oct. 31, 1893.
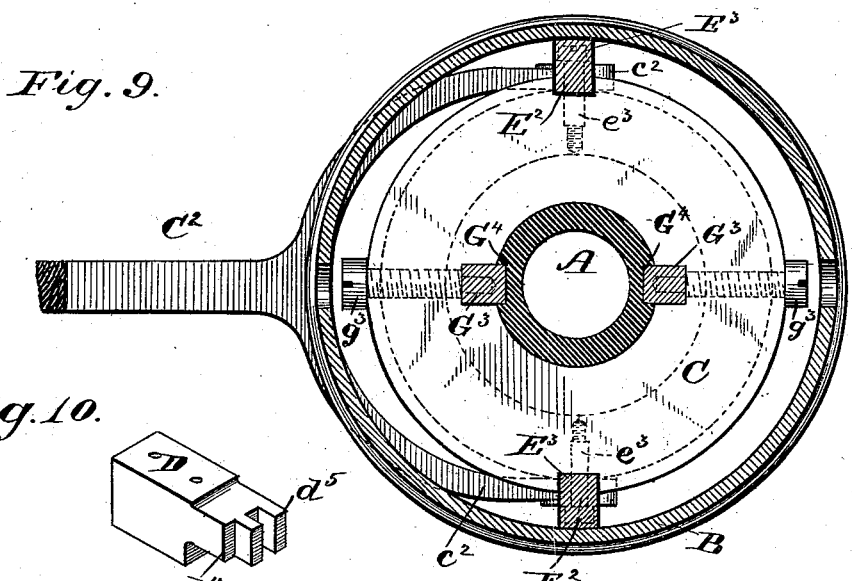
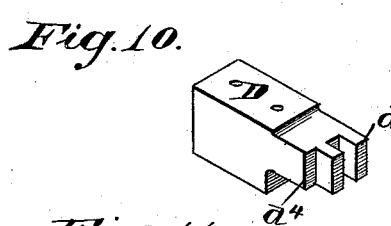
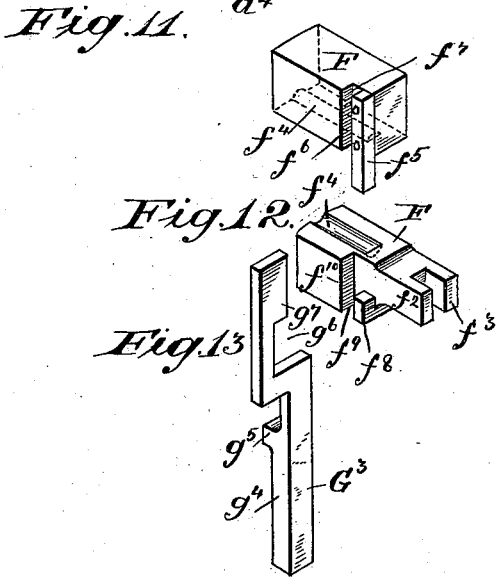
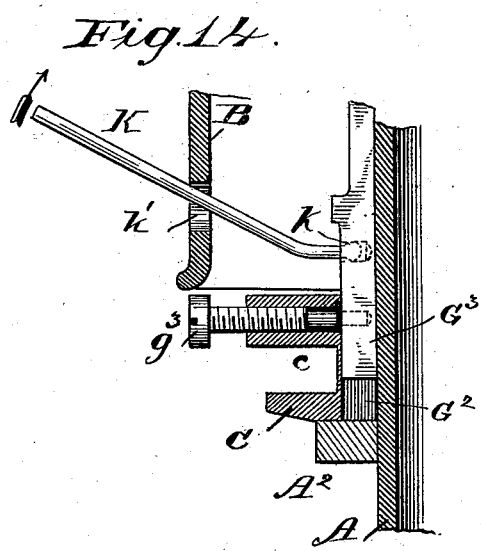
Witnesses
Arthur Johnson
A. S. Wells
Inventor
Jerome W. Cook Administrator
of Frank S. Cook Deceased.
By his Attorney
Joseph A. Parkinson

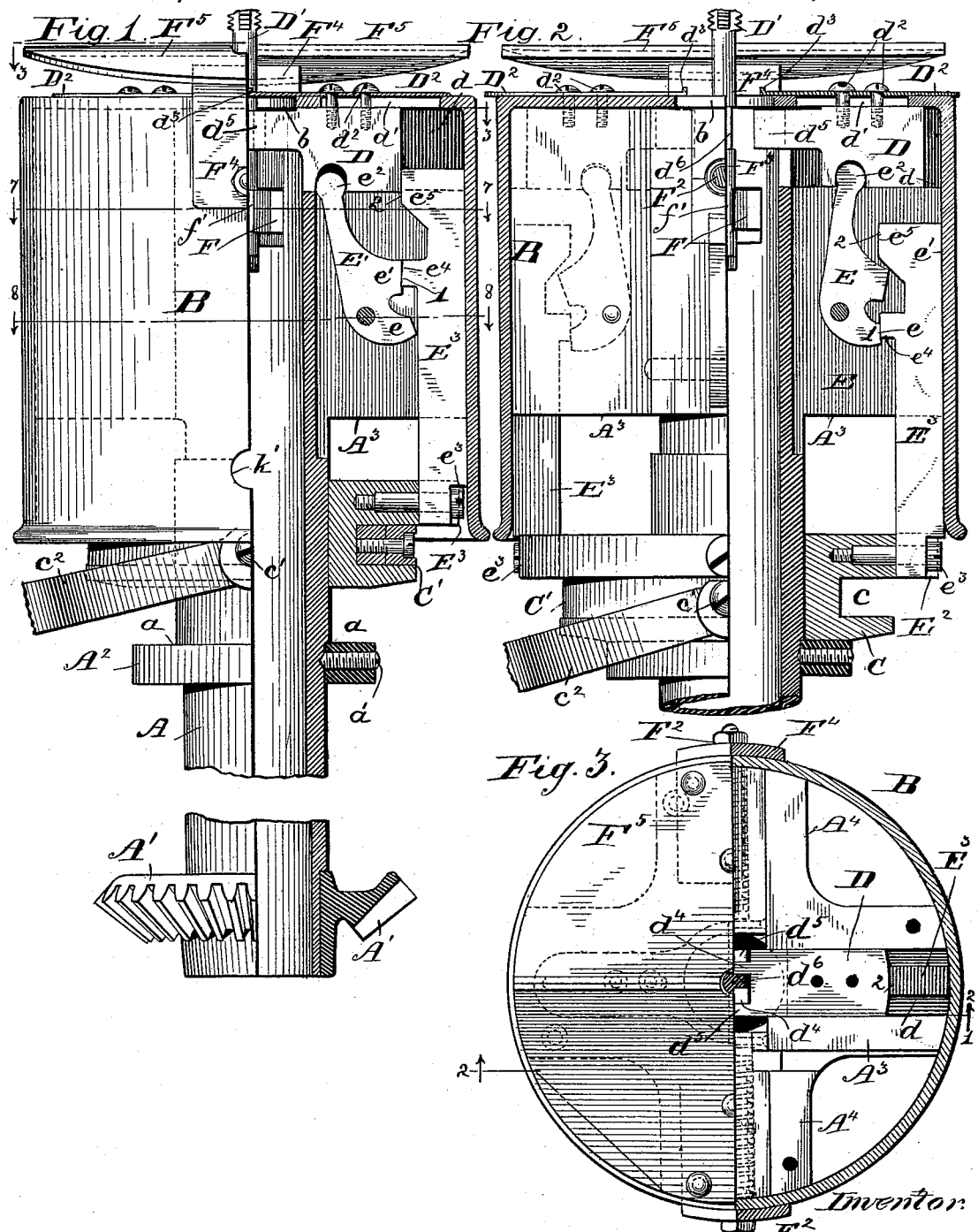

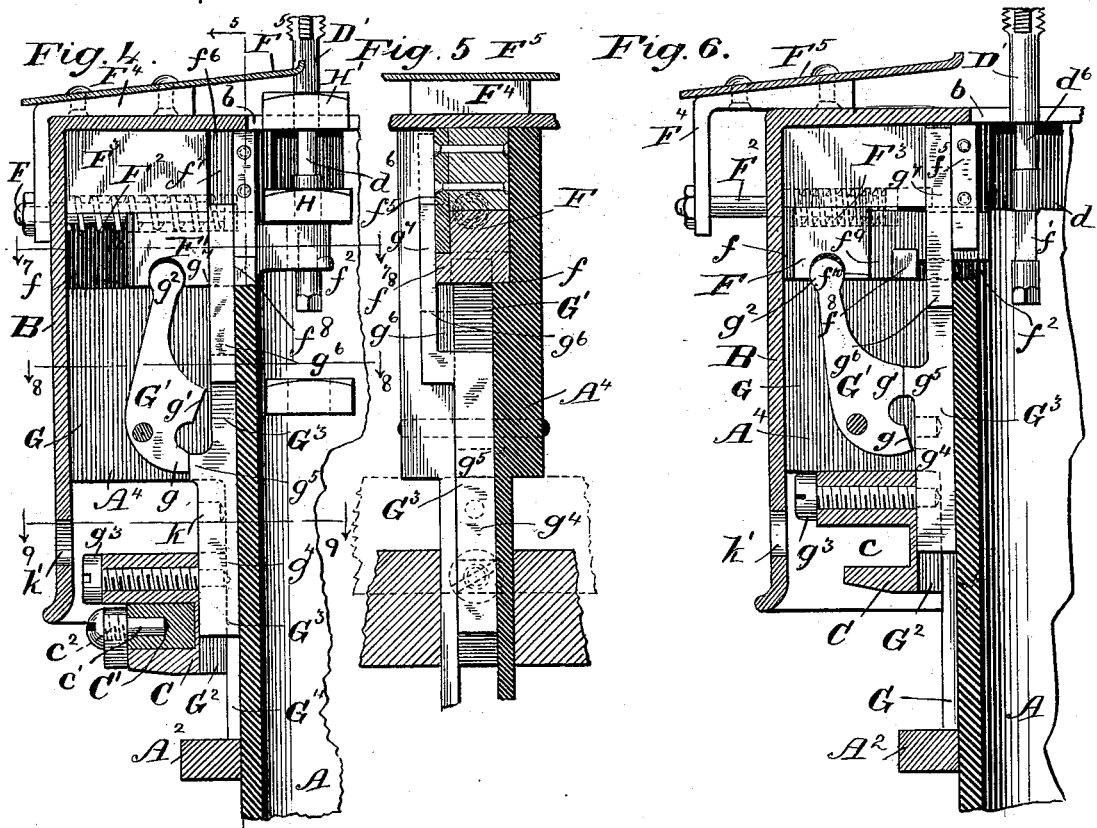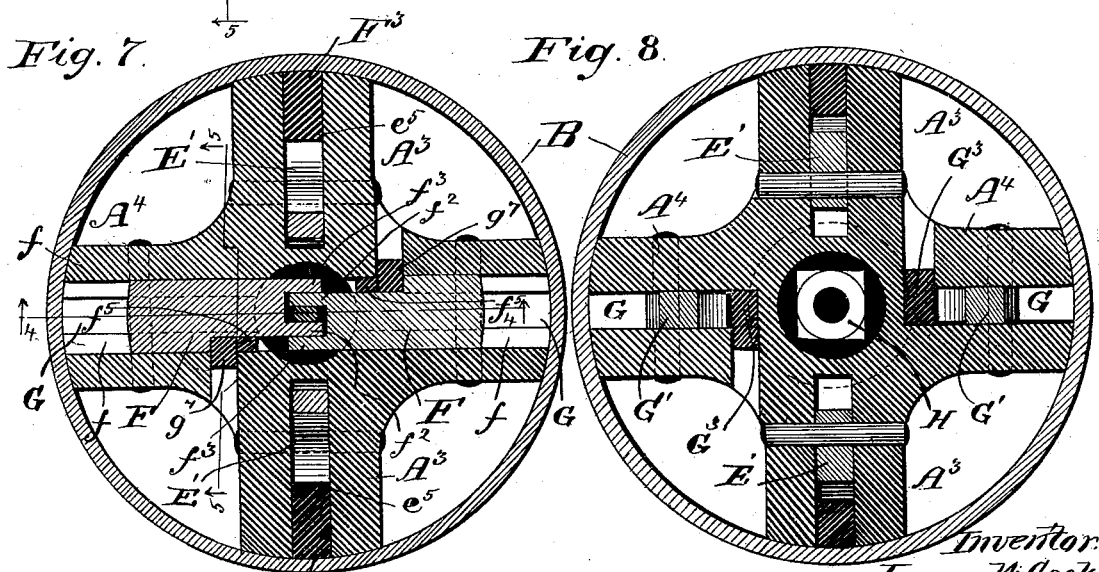

UNITED STATES PATENT OFFICE.

JEROME W. COOK, OF SPRINGFIELD, OHIO, ADMINISTRATOR OF FRANK S. COOK, DECEASED.

MACHINE FOR TAPPING SCREW-NUTS.

SPECIFICATION forming part of Letters Patent No. 507,972, dated October 31, 1893.

Application filed September 1, 1892. Serial No. 444,847. (No model.)

*To all whom it may concern:*

Be it known that FRANK S. COOK, formerly of Springfield, Clark county, Ohio, but now deceased, did invent certain new and useful Improvements in Nut-Tapping Machines, of which I, JEROME W. COOK, administrator of the estate of said FRANK S. COOK, deceased, hereby declare that the following description, in connection with the accompanying drawings, forming part thereof, is a specification.

This invention relates to that type of machines made the subject of Letters Patent granted Frank S. Cook on the 21st day of October, 1890, and numbered 438,605, wherein nut-blanks are fed to a vertical tap supported in a chuck which alternately releases the tap at one point and simultaneously grasps it at another point to permit the threaded nut to drop down along the shank and leave the shaft without stopping the machine.

The present improvements relate particularly to the chuck whereby the tap is simultaneously grasped and released by alternately operating jaws, and they consist in combining with the hollow chuck-spindle, jaws moving at right angles to the axis thereof and embracing flattened or squared sections of the tap shank between rigid interlocking surfaces; in forming such spindle with radial slotted wings provided with seats or ways for sliding jaws and recessed for the play of cams and levers operating said jaws; in combining therewith the housing and closing the top and sides of the chuck and revolving with the spindle; in combining with the tap and chuck-spindle and one set of sliding jaws, shields supported by said jaws and sliding therewith to prevent the access of chips to the chuck-devices; in combining with the tap, the chuck-spindle and housing, a pair of sliding jaws moving parallel with the top of the housing and directly underneath, and shields supported from said jaws on the upper surface of the housing and sliding with the jaws; in combining with the two sets of sliding jaws, shields attached to the individual jaws of each set, the shields carried by one pair of jaws being arranged above the shields carried by the other pair; in combining with one or both sets of sliding jaws a sliding cam-bar or locking-bar arranged to act as a spline; and in various other combinations and details of construction hereinafter described and explained.

In the drawings:—Figure 1 is a side elevation sectioned on the line 1—1, Fig. 3, of a chuck-head embodying said invention. Fig. 2 is a sectional elevation, taken on the correspondingly numbered line of Fig. 3; Fig. 3, a top-plan view, in section as indicated by broken lines and arrows in Fig. 1. Fig. 4 is a vertical central section, partly broken away, on the correspondingly numbered line of Fig. 7; Fig 5, a detail, in section, on the line 5—5 of Figs. 4 and 7; Fig. 6, a vertical section on the same line as Fig. 4 with the parts in a different stage of action; Figs. 7 and 8, horizontal sections on correspondingly numbered lines in Figs. 1 and 4; and Fig. 9, a section on line 9—9 of Fig. 4; Figs. 10 to 13, details in perspective, of one of the upper jaws, a locking or stop-block for controlling a lower jaw, the lower jaw to operate therewith; and the cam-bar for actuating said lower jaw; and Fig. 14, an enlarged detail to explain the devices for removing the tap from the chuck.

A represents the tubular chuck-spindle having at its lower end a bevel gear, A', and above said gear receiving a collar, $A^2$, which is primarily for the purpose of resting upon the top of a bearing brass, such for instance as described in an application filed concurrently herewith, but serves also to limit the movement of a sliding sleeve, below described. Above this collar the spindle is slightly enlarged forming a shoulder against which the collar is seated. Clamping screws, $a'$, one or more, hold said collar in position and prevent its rotation. The upper part of the spindle has radial wings, $A^3$, $A^4$, arranged on diameters, so that the two wings, $A^3$, are opposed to each other and the wings, $A^4$, are at an angle to the line of the preceding pair, preferably at a right angle. Inclosing and covering these wings and the spindle to a point some distance below the wings, is a cylindrical housing, B, having an opening, $b$, through its top equal to the internal bore of the spindle and secured thereto so as to revolve therewith. Beneath the wings the cylindrical extension of the chuck-spindle receives a sliding sleeve, C, which is of such diameter that it may enter within the housing and play up and down through the bottom thereof between the top of the collar on the spindle and the lower edge of the wings; that is, from the position shown in Fig. 2 to that shown in Fig. 6. This sleeve has an annular groove, $c$, to receive a ring or strap, $C'$, to which are pivoted at $c'$, the forks $c^2$, of the lever, $C^2$, controlled, as in said former patent, by a suitable cam, whereby to and fro motion is imparted to the sleeve within the limit named. The first pair of wings, $A^3$, are slotted radially from the axis of the chuck spindle to afford seats, $d$, for the play of sliding jaws, D, hereinafter termed the upper jaws, which clasp the tap, $D'$, and the tops of which come against the under surface of the top-plate of the housing. This top-plate has slots, $d'$, parallel with the line of movement of the jaws, and semi-circular shields, $D^2$, placed upon the upper surface of said top-plate are secured to the respective jaws by means of screws, $d^2$, passing through said slots, so that as the jaws are advancing to grasp the tap the shields are carried forward until their flanged opposing edges, $d^3$, meet and completely cover the chuck, to shut off chips and débris. These jaws are not intended to nip the tap between their faces but are formed with flattened projecting teeth or fingers, $d^4$, $d^5$, with faces parallel with the axis of the tap, arranged so that those of one jaw slip past and interlock with those of the opposing jaw, as in Fig. 3, leaving a central space between the base and one finger of one jaw and the base and one finger of the other jaw in which the flattened section, $d^6$, of the tap is embraced so that it has one tooth of each jaw on each side, that is, the thickness of two teeth on both sides, and is clasped, as it were, in a rigid unyielding socket.

Beneath the seats for the upper jaws just described, the wings, $A^3$, of the chuck-spindle have narrower slots, E, extending to their base, in which are pivoted levers, $E'$, having cam projection, $e$, $e'$, on each side of their pivots and having rounded heads, $e^2$, entering sockets in the bottom of the jaws. Recesses, $E^2$, in the outer periphery of the sliding sleeve receive the lower ends of up-standing cam-bars, $E^3$, secured in said recesses by screws, $e^3$, and provided at their upper ends with two cam projections, $e^4$, $e^5$, the former engaging alternately the tail-cam, $e$, and the body-cam, $e'$, of the adjacent lever and the latter engaging with the back or heel of the jaw to lock it in position. These bars fit snugly in the slots which receive the levers and their backs rest against the inner wall of the housing. When the sliding sleeve is at the limit of its downward play, as in Fig. 2, the plane surface 1 of the cam, $e^4$, is engaged with the tail-cam of the lever and locks the jaws open. When, however, the sleeve is elevated, this lower projection or cam strikes the body-cam of the lever and forces the jaw shut and its plane surface engages with a plane surface on said body-cam, while the plane surface, 2, of the upper projection or cam, $e^5$, passes behind the jaw, as in Fig. 1, thus locking said jaw effectually closed by the action conjoint of both cams. The second pair of wings, $A^4$, are also slotted radially from the axis of the chuck-spindle to form seats or ways, $f$, for the play of sliding jaws, F, hereinafter termed the "lower jaws," since they clasp the flattened or squared lower section, $f'$, of the tap when the upper flattened section is released by the upper jaws. Like the first set of jaws these lower jaws are formed with projecting teeth, $f^2$, $f^3$, so arranged that those of one jaw slip past and interlock with those of the opposing jaw, as in Fig. 7, leaving a central space in which said flattened or squared section of the tap is embraced, with one tooth of each jaw on each side, or the thickness of two teeth on both sides.

Between the lower jaw and the top of the housing is a spacing-block, $F'$, which will be secured to the housing and held against movement. The contiguous surfaces of the jaw and the spacing-block, that is, the upper surface of the jaw and the lower surface of the spacing-block have longitudinal semi-cylindrical channels, $f^4$, of equal length, which receive the headed bolt, $F^2$, projecting through the side of the housing, and around this bolt, between its head and the inner wall of the housing, is arranged a coiled expansion-spring, $F^3$, acting to urge the jaws into engagement with each other and with the tap. When the jaws are thus projected the head of the bolt comes against the end of the semi-cylindrical channel in the spacing-block as in Fig. 4, and the spring is prevented from further expansion, but when the jaws are retracted the end of the channel in the upper surface of the jaw pushes back the bolt beyond the exterior of the housing, as in Fig. 6. A bracket, $F^4$, rising from the outer end of this bolt bends over the top of this housing and upon this bracket is mounted an inclined shield, $F^5$, one for each jaw, which, in the advance and recession of the jaws will be carried in toward the tap at right angles to the path of the underlying shields on the upper jaws, to meet its companion supported from and moving with the opposite jaw, or it will be thrown out as in Fig. 6, such closing and opening movements being alternate with the closing and opening movements of the shields beneath, mounted on the upper jaws. The spacing-block is cut away on one side, and at its extreme end has attached a locking-strip, $f^5$, of the same thickness as the cut away portion, thus forming with the shoulder, $f^6$, of the cut away part a channel, $f^7$, for the reception of the locking end of the cam-plate or bar presently described. The lower end of this strip depends beneath the block to such a point that, when the lower jaw is projected, it will come above and form an extension of a lug, $f^8$, projecting from a cut away part of said lower jaw, and at such a distance from a shoulder, $f^{10}$, thereof, leaving a channel, $f^9$, of the width of that in the spacing-block, so that when the strip or lug or off-set register with each other, an extended channel will be formed on a single line with the same width throughout, and any plate filling said channel will lock the jaw to the unyielding spacing-block and prevent it from either advancing or retreating.

Beneath the seats for the lower jaws the wings, $A^4$, of the chuck-spindle are slotted down to their base, but these slots, G, are narrower than the seats for the jaws and of such width only that they will receive the pivoted levers, G', having cam-projections, $g$, $g'$, on each side of their pivots and having rounded heads, $g^2$, entering sockets in the bottom of the jaws. Recesses, $G^2$, cut from the central bore of the sliding sleeve outwardly receive the lower ends of the cam and locking-bars, $G^3$, secured in the recesses by screws, $g^3$, and entering into the longitudinal grooves, $G^4$, in the outer periphery of the chuck-spindle and, therefore, adding to their other functions, that of splines or keys to cause the sleeve to rotate with the chuck-spindle, notwithstanding its movements therealong.

The cam-bars operating the lower jaws differ from those which operate the upper jaws in several respects. Each has a shank, $g^4$, of such width and thickness that it fills the longitudinal groove, $G^4$, and the opposing recess in the sliding sleeve and performs the office of a spline from which the remainder of the bar is relieved. Near the upper end of this shank it has a cam projection, $G^5$, which engages alternately with the tail-cam, $g$, and the body-cam, $g'$, of the adjusting lever. Beyond this its thickness is reduced and it is offset laterally and cut away to afford a passage, $g^6$, through which the lug from the lower jaw can pass when said jaw is projected by its spring or withdrawn by its lever. Beyond this opening it is widened again to afford a locking projection or plate, $g^7$, which enters the channel between the lateral lug and shoulder of the jaw and the locking strip and shoulder of the spacing-block and serves to lock the jaw in its advance position. When the spring pressed lower jaw is in its retracted position, the cam and locking-bar is at the extreme of its upward movement (Fig. 5), with its cam-projection, $g^5$, engaging the body-cam, $g'$ of the lever which actuates said jaw, and locking the jaw open, and the lateral offset from said jaw is outside of the cam-bar and in range with the lower end of the opening therethrough, while the locking section of said bar fills the groove or channel formed by the shouldered spacing-block and its pendent strip. When the sleeve begins to fall it draws the cam-bar down carrying the cam-projection temporarily out of engagement with the lever, when the force of the spring projects the jaw past the opening in the locking-bar and into the position shown in Fig. 4, and, as said bar continues to descend, its cam-projection engages with the tail-cam of the lever while the locking-section at its upper end, not yet having left the channel in the spacing-block, engages the lateral offset of the jaw, and is slowly withdrawn along the extension of the channel in the jaw, rigidly securing the jaw against retraction. The yet continued movement carries the cam-projection below the tail of the pivoted lever, but this locking section still remains in engagement with the channel in the jaw and holds the latter locked, and consequently the lever in position for the return of the cam-projection in the upward rise of the sleeve. Meanwhile, succeeding the sudden projection of the sliding jaw, the upper jaws have been opened and the finished nut, H, has fallen therefrom upon the lower jaws, and now, while the lower jaws are held closed, they are returned to position to grasp the flattened shank of the tap. Concurrently with their closing movement the locking-bars rise, still temporarily retaining the lower jaws fixed in position until the cam-projection, $g^5$, has passed by the tail of the operating lever and engaged with the body-cam, $g'$, at which moment the lateral offsets of the lower jaws register with the opening or cut away part of the locking-bar and the jaws are retracted against the stress of their springs, pushing out the spring-bolt and opening the upper or secondary set of shield-plates.

In order to remove the tap the shanks of the locking-bars have each a socket, $k$, formed therein adjacent to the screw by which they are fastened to the sleeve, into which socket may be inserted one end of the lever, K. The housing is bored at $k'$ (see Figs. 4 and 14), to afford a fulcrum for this lever which is, of course, to be inserted and removed through said opening. When it becomes necessary to remove or replace the tap, the screws fastening the locking-bar to the sleeve are withdrawn, as in Fig. 14, then the lever is applied and the cam or locking-bar pushed downward to the base of the sleeve, entirely removing it from engagement with the lower jaws; the sleeve then being operated in such manner as to open the upper jaws, the lower jaws can be opened at will, by pressing apart the exposed shields carried thereby, and a new tap inserted and the jaws released, when they will at once grasp the squared lower section of the tap. The locking-jaws may then, by means of the lever, be readjusted, their confining screws driven home and the next action of the machine will cause the regular operation to be resumed.

So far as the interlocking feature of the chuck-jaws is involved, it is not intended to limit the invention to the use of sliding-jaws, as it is evident that jaws pivoted to swing in a plane intersecting the axis of the tap or chuck may be formed with interlocking fingers. Such jaws, however, will not be able to so effectually embrace the squared section of the shanks on all sides as may be done by the use of sliding-jaws moving in lines at right angles to the length of the axis, since the latter may be so shaped that while their interlocking fingers grasp two flat sides of the squared jaws, the faces of the jaws at the base of these fingers will present flat surfaces to grasp or nip the other two sides. Moreover, it will be understood, that the terms upper and outer, under and lower, top and bottom, applied to the position of the parts, are simply relative terms, referring to the position of the parts as shown in the drawings, and are not intended as material terms of limitation.

What I claim as the invention of the said FRANK S. COOK, deceased, is—

1. The combination substantially as hereinbefore set forth, with the chuck-spindle, of jaws each provided with flattened fingers having internal faces parallel with the axis of the tap, which interlock with similar fingers on the opposing jaw and embrace the shank of the tool in a recess thus formed between the base and one finger of one jaw and the base and one finger of the other jaw.

2. The combination substantially as hereinbefore set forth, with the chuck-spindle, of sliding-jaws, each provided with projecting fingers flattened parallel with the axis of the tap, opposed to similar projecting fingers on the other jaw, and arranged to slip past each other as the jaws are brought together and leave a recess between the base and one finger of one jaw and the base and one finger of the other jaw.

3. The combination, substantially as hereinbefore set forth, with the chuck-spindle and its slotted wings, of the upper sliding jaws seated in said wings, the housing slotted in lines parallel with the movement of said jaws, and the sliding shields secured to said jaws by bolts or screws passing through the slots in the housing.

4. The combination, substantially as hereinbefore set forth, of the chuck-spindle provided with wings having seats and slotted beneath said seats, sliding-jaws moving in said seats, levers pivoted in the slots beneath said jaws, engaging with sockets in the jaws, and having body and tail cam projections, a sliding sleeve, and bars secured to said sleeve and having cam and locking projections to engage with the heel of the jaw and the lever-cams.

5. The combination, substantially as hereinbefore set forth, of the chuck-spindle having wings provided with seats or ways and slotted beneath said ways, jaws sliding in said seats, levers pivoted in the slots beneath said seats, engaging with the jaws, and having cam-projections each side of their pivot, the housing embracing the exterior of the wings, the sliding sleeve and cam-bars secured to said sleeve, seated as to their backs against the housing and provided with cam and locking projections, the first to advance and retract the jaws by engaging with the lever-cams and the second to lock the jaws in their advanced position by engaging with their heels.

6. The combination, substantially as hereinbefore set forth, of the chuck-spindle having wings provided with seats or ways and slotted beneath said ways, jaws sliding in said seats, levers pivoted in the slots beneath said seats engaging with the jaws and having cam-projections each side of their pivot, the housing embracing the exterior of the wings, the sliding-sleeve and cam-bars secured to said sleeve, seated as to their backs against the housing fitting into the slots of the wings, and provided with cam and locking projections, the first to advance and retract the jaws by engaging with the lever-cams, and the second to lock the jaws in their advanced position by engaging with their heels.

7. The combination, substantially as hereinbefore set forth, of the chuck-spindle having wings provided with seats or ways, the spacing-blocks grooved or channeled on their under surface, the sliding jaws grooved or channeled on their upper surface, the headed bolts entering the recesses formed by the channels, and the springs coiled around said bolts and operating to force the sliding jaws forward.

8. The combination, substantially as hereinbefore set forth, of the chuck-spindle having wings provided with seats, of the housing, the spacing-blocks grooved or channeled on their under surface through a portion of their length, the sliding jaws arranged within the seat beneath the spacing-blocks and grooved or channeled on their upper surfaces opposite the grooves or channels in the spacing-block, the headed bolts arranged within the recesses formed by said grooves or channels, coiled springs seated at one end against the head of the bolts and at the other end against the housing, the brackets secured to the outer end of the bolts beyond the housing, the shields secured to the brackets above the top of the housing, and means for retracting the sliding jaws against the force of the springs.

9. The combination, substantially as hereinbefore set forth, of the chuck-spindle having wings provided with seats or ways and slotted beneath said seats, the spacing-blocks grooved or channeled on their under surface, the sliding jaws grooved or channeled on their upper surface, the headed bolts entering the recesses formed by the matching channels, the springs coiled around the bolts and operating to force the sliding jaws forward, the levers pivoted in the slotted wings beneath the jaws and engaging with sockets in said jaws, and the cam-bars operating said levers to retract the jaws against the force of the springs.

10. The combination, substantially as hereinbefore set forth, of the chuck-spindle having wings provided with seats and ways and slotted beneath said ways, the spacing-blocks grooved or channeled on their under surface, the sliding-jaws grooved or channeled on their upper surface, the headed bolts entering the recesses formed by the channels, the springs coiled around said bolts and operating to force the sliding jaws forward, the levers pivoted in the slotted wings beneath said jaws, engaging with the jaws, and having cam projections and the sliding bars having a cam projection engaging with the lever cams.

11. The combination, substantially as hereinbefore set forth, of the chuck-spindle having a longitudinal groove or grooves and radially slotted wings, jaws playing in the slots in said wings and levers provided with cam-projections for operating the jaws, the sliding sleeve, and cam-bars secured to said sliding sleeve, provided with cam-projections engaging the cam-projections on the lever to move the jaws to and fro, and one or both fitting within the longitudinal groove or grooves of the spindle.

12. The combination, substantially as hereinbefore set forth, of the fixed spacing-block having a locking-channel, the sliding jaw also having a locking-channel, the lever engaging with said sliding jaw and having cam-projections, the sleeve, and the sliding-bar attached to said sleeve, having a cam-projection to engage the lever-cams, and a locking extension to engage the channels in the spacing-block and sliding jaw.

13. The combination, substantially as hereinbefore set forth, of the spacing-block having a locking-channel, the sliding jaws also having a locking-channel, the headed bolt, the spring encircling said bolt and urging the jaw forward, the pivoted lever engaging with a socket in the sliding jaw and having cam-projections, the sliding sleeve, and the bar attached thereto having a cam-projection to engage with the lever cams and a locking extension to enter the channels in the spacing-block and jaw.

14. The combination, substantially as hereinbefore set forth, of the spacing-block having a locking-channel and pendent locking strip forming one side of said channel, the sliding jaw having a locking-channel to register with the one in the spacing-block and an offset forming one side of said channel to register with the pendent strip, the headed bolt and its spring, the pivoted lever engaging with the socket in the sliding jaw and having cam-projections, the sleeve, and the bar attached thereto having a cam-projection to engage with the lever cams, a recess or opening to permit the passage of the offset from the jaw and a locking extension to engage with the channels in the jaw and spacing-block.

15. The combination, substantially as hereinbefore set forth, of the chuck-spindle having radial wings formed with seats and slotted beneath said seats, the upper sliding jaws moving in the seats in two of said wings, the lower sliding jaws moving in seats in the other two wings, the levers pivoted on the slots of the wings beneath said jaws and engaging with the sockets in the jaws, the housing, the sliding sleeve, the cam and locking bars attached to the outer periphery of the sleeve to operate the upper jaws and the cam and locking-bars attached to the inner periphery of said sleeve to actuate the lower jaws.

16. The combination, substantially as hereinbefore set forth, of the longitudinally channeled chuck-spindle having radial wings provided with seats and slotted beneath said seats for the reception of levers, the upper sliding jaws playing in two of said seats, the lower sliding jaws playing in the other two, the levers engaging with sockets in said jaws and pivoted in the slotted wings, beneath the jaws, the sliding sleeve, the cam and locking-bars attached to the exterior of said sliding sleeve to actuate the upper jaws, and the cam and locking-bars attached to the interior of said sleeve to actuate the lower jaws and fitting in the grooves or channels in the spindle to serve as splines.

17. The combination, substantially as hereinbefore set forth, of the lower sliding jaws, sliding sleeve, levers, cam and locking-bars secured by screws and socketed as set forth, and the housing having an opening adjacent to the sleeve opposite to the sockets in the cam-bar to serve as a fulcrum for a lever.

JEROME W. COOK,
*Administrator of the estate of Frank S. Cook.*

Witnesses:
A. P. LINN COCHRAN,
ROBERT C. RODGERS.